UNITED STATES PATENT OFFICE.

JOSEPH B. MERIAM, OF CLEVELAND, OHIO.

IMPROVEMENT IN SEPARATING PARAFFINE FROM HYDROCARBON OILS.

Specification forming part of Letters Patent No. 177,347, dated May 16, 1876; application filed December 11, 1875.

*To all whom it may concern:*

Be it known that I, JOSEPH B. MERIAM, of Cleveland, in the county of Cuyahoga and State of Ohio, have invented certain new and useful Improvements in Process for Separating Paraffine from Hydrocarbon Oils; and I do hereby declare the following to be a full, clear, and exact description of the invention, such as will enable others skilled in the art to which it pertains to make and use it, reference being had to the accompanying drawings, which form part of this specification.

My invention relates to an improved process for separating paraffine from hydrocarbon oils.

Heretofore paraffine has usually been removed from hydrocarbon oils by putting the material into sacks or folds of canvas, or folds of hair cloth, &c., and then subjected to pressure at a low temperature. The difficulty, however, in those processes was that the heavier the pressure that was applied the more open would the pores of the bags or sacks become, and the more readily would the paraffine pass through them, rendering it almost impracticable to make a thorough separation of the paraffine from the oil.

I have discovered that the scales of paraffine that are thus left, after thus extracting the oil by pressure at a low temperature, are separate and distinct, and, except under the application of heat, cannot be, by ordinary pressure, reduced to an impervious mass; and I make use of this property as follows, for the purpose of separating the paraffine from oils.

I first take suitable receptacles, preferably of metal, protected by a non-conductor of heat, which receptacles have perforated bottoms. I then place over the bottom on the inside a wire-gauze, screen, or cloth to prevent the scales of paraffine from falling through. I then fill in upon the said screen a quantity of paraffine scales that have been separated from hydrocarbon oil by pressure under a low temperature, as above described. The hydrocarbon oil to be treated is then prepared as follows: It is first reduced to a low temperature, sufficiently to chill it, and leave it in the condition termed "granulated." This oil in its chilled granulated condition is then put into the vat upon the paraffine scales, and then subjected to a pressure under a low temperature, in any convenient way, as, for instance, by a plunger. This pressure drives the oil through the mass of paraffine scales, which filters from it the paraffine that may be contained therein.

It is very evident that the greater the pressure that is applied the more closely will the paraffine scales be pressed together, and the more perfectly will it filter the paraffine from the oil that is being operated upon. In this way I am enabled to make an almost perfect separation of the paraffine from the oil, thus leaving the oil in a practically pure condition. It is evident that the vat will eventually fill with paraffine, and should be removed, in part, from time to time, as circumstances may require, leaving at all times a sufficient amount of the paraffine scales in the receptacle to act as a substantial filter. So, also, it is evident that instead of employing a wire-gauze, screen, or cloth, any equivalent substance may be employed.

I am aware that oil resting on a body of water has been filtered by forcing the same upward through a filter-cloth, the solid matters gradually collecting and consolidating on the lower surface of the cloth filter, and from whence it is removed; and such process I do not claim.

What I claim is—

The process of separating paraffine from hydrocarbon oils, the same consisting in first placing a mass of paraffine scales on a rigid screen secured within a proper receptacle, and then forcing chilled hydrocarbon oil through said mass, the strata of paraffine scales that accumulates on said mass being removed from time to time, substantially as and for the purpose set forth.

In testimony whereof I have signed my name to this specification in the presence of two subscribing witnesses.

JOSEPH B. MERIAM.

Witnesses:
 FRANCIS TOUMEY,
 EDWARD WALSH.